United States Patent
Kumar et al.

(10) Patent No.: US 10,884,673 B2
(45) Date of Patent: Jan. 5, 2021

(54) VIRTUAL ONE-TIME PROGRAMMABLE MEMORY MANAGEMENT

(71) Applicant: Cryptography Research, Inc., Sunnyvale, CA (US)

(72) Inventors: Ambuj Kumar, Sunnyvale, CA (US); Roy Moss, Palo Alto, CA (US)

(73) Assignee: CRYPTOGRAPHY RESEARCH, INC., San Jose, CA (US)

( * ) Notice: Subject to any disclaimer, the term of this patent is extended or adjusted under 35 U.S.C. 154(b) by 0 days.

(21) Appl. No.: 16/528,232

(22) Filed: Jul. 31, 2019

(65) Prior Publication Data

US 2020/0026474 A1    Jan. 23, 2020

Related U.S. Application Data

(63) Continuation of application No. 15/153,624, filed on May 12, 2016, now Pat. No. 10,379,785.

(60) Provisional application No. 62/162,036, filed on May 15, 2015.

(51) Int. Cl.
*G06F 3/06* (2006.01)
*G06F 12/1036* (2016.01)
*G06F 12/06* (2006.01)

(52) U.S. Cl.
CPC .......... *G06F 3/0673* (2013.01); *G06F 3/0604* (2013.01); *G06F 3/0665* (2013.01); *G06F 12/0638* (2013.01); *G06F 12/1036* (2013.01); *G06F 2212/657* (2013.01)

(58) Field of Classification Search
CPC ............... G06F 3/0673; G06F 12/0638; G06F 12/1036; G06F 3/0604; G06F 3/0665; G06F 2212/657
See application file for complete search history.

(56) References Cited

U.S. PATENT DOCUMENTS

| | | |
|---|---|---|
| 6,009,520 A | 12/1999 | Gharda |
| 6,564,318 B1 | 5/2003 | Gharda et al. |
| 8,429,375 B1 | 4/2013 | Pollack et al. |
| 8,433,879 B1 | 4/2013 | Pollack et al. |
| 8,644,076 B2 | 2/2014 | Chi et al. |
| 8,650,441 B2 * | 2/2014 | Chen ................... G06F 12/0238 714/12 |
| 8,898,425 B1 | 11/2014 | Pollack et al. |
| 8,941,470 B2 * | 1/2015 | Butler .................. G06F 3/0679 340/10.1 |

(Continued)

OTHER PUBLICATIONS

Stamme, Bernd, "OTP with a ROM Conversion Option Provides Flexibility and Cost Savings for On-Chip Microcode Storage", located online at http://www.design-reuse.com/articles/21414/otp-rom-conversion-on-chip-microcode-storage.html, pp. 1-4, published Aug. 31, 2009. 4 pages.

*Primary Examiner* — Christopher D Birkhimer
(74) *Attorney, Agent, or Firm* — Lowenstein Sandler LLP (57) ABSTRACT

A virtual memory including virtual addresses may be generated. A first virtual address of the virtual memory may be mapped to a first physical address of a one-time programmable (OTP) memory of a device. Furthermore, a second virtual address of the virtual memory may be mapped to a second physical address of a static memory of the device. The virtual memory that is mapped to the OTP memory and the static memory may be provided for accessing of the data of the OTP memory of the device.

20 Claims, 7 Drawing Sheets (56) References Cited

U.S. PATENT DOCUMENTS

| | | | |
|---|---|---|---|
| 8,947,233 B2* | 2/2015 | Butler | G06F 3/0659 340/572.1 |
| 8,966,154 B2* | 2/2015 | Chen | G11C 16/102 711/102 |
| 8,988,223 B2* | 3/2015 | Puleston | G06F 1/3225 340/572.1 |
| 2002/0120810 A1 | 8/2002 | Brouwer | |
| 2007/0290715 A1 | 12/2007 | Baer et al. | |
| 2007/0294497 A1 | 12/2007 | Chen | |
| 2008/0086780 A1 | 4/2008 | Chen et al. | |
| 2008/0271164 A1 | 10/2008 | Dellow et al. | |
| 2009/0113114 A1 | 4/2009 | Berenbaum et al. | |
| 2011/0067110 A1 | 3/2011 | Markey et al. | |
| 2011/0246699 A1 | 10/2011 | Takala et al. | |
| 2012/0054545 A1* | 3/2012 | Chen | G06F 12/0238 714/15 |
| 2012/0066437 A1* | 3/2012 | Chen | G11C 16/102 711/103 |
| 2013/0024644 A1 | 1/2013 | Givargis et al. | |
| 2014/0071726 A1 | 3/2014 | Chung | |
| 2014/0223078 A1 | 8/2014 | Gravelle | |
| 2014/0292490 A1* | 10/2014 | Butler | G06K 19/073 340/10.1 |
| 2015/0061840 A1* | 3/2015 | Butler | G06F 3/0659 340/10.51 |
| 2015/0067313 A1* | 3/2015 | Zaidi | G06F 21/572 713/2 |
| 2015/0070963 A1* | 3/2015 | Ryu | G11C 17/146 365/96 |
| 2015/0129666 A1* | 5/2015 | Butler | H04L 67/04 235/492 |
| 2015/0242213 A1 | 8/2015 | Li et al. | |
| 2015/0317152 A1 | 11/2015 | Todd | |

* cited by examiner

VIRTUAL ONE-TIME PROGRAMMABLE MEMORY MANAGEMENT

RELATED APPLICATION

This application is a continuation of U.S. patent application Ser. No. 15/153,624 filed on May 12, 2016, which claims the benefit under 35 U.S.C. § 119(e) of U.S. Provisional Application 62/162,036 filed on May 15, 2015, each of which is hereby incorporated by reference.

BRIEF DESCRIPTION OF THE DRAWINGS

The present disclosure will be understood more fully from the detailed description given below and from the accompanying drawings of various implementations of the disclosure.

DETAILED DESCRIPTION

Aspects of the present disclosure are directed to management of a virtual one-time programmable (OTP) memory. A device, such as an integrated circuit, may include an OTP memory and a static memory (e.g., a netlist or read-only memory). Virtual memory may be used to map virtual addresses used by software of the device to physical addresses of physical memory. For example, the virtual memory used by software when accessing functionality of the device may be mapped to a combination of the OTP memory and the static memory. For example, a first virtual address of the virtual memory may be mapped to a physical address of the OTP memory and a second virtual address of the same virtual memory may be mapped to another physical address corresponding to the static memory. Thus, the virtual memory may be implemented based on mappings to both OTP memory and static memory.

The OTP memory and the static memory of the device may be used to store data such as cryptographic keys, device identification information, and commands that may be implemented by the device. For example, the data may be provisioned or programmed into the OTP memory of the device at a manufacturing facility. The data that is programmed into the device may be a combination of data that is unique to the device and information that may be associated with other devices (e.g., a class of devices or all devices). The manufacturing facility may program the OTP memory to include both unique information and the information that may be associated with other devices. However, the programming of the OTP memory to include all of the data from the manufacturing facility may result in the OTP memory being fully utilized or full.

Instead of programming the OTP memory to store all of the data (e.g., both unique data and data associated with multiple devices or data that is not unique to a single device), a virtual memory may be used so that a portion of the data may be stored in the OTP memory and another portion of the data may be stored in static memory. For example, a virtual OTP memory manager component of the device may manage the mapping between the virtual memory and the OTP memory and static memory. The virtual OTP memory manager component may receive data from the manufacturing facility that is to be programmed into the OTP memory and may determine if the received data is currently stored in static memory (e.g., a netlist or read-only memory) of the device. If the received data that is to be stored in the OTP memory is already stored in the static memory, then the virtual OTP memory manager component may not write or program the received data into the OTP memory but may return a status indicator or status message that indicates that the data received from the manufacturing facility has been successfully programmed or stored in the OTP memory. The manufacturing facility may then proceed with transmitting additional data that is intended to be stored in the OTP memory of the device after receiving the indication that the previous data was stored in the OTP memory. Thus, the manufacturing facility may not be aware of the virtual memory that is used to virtualize the OTP memory by using the static memory to store some data as opposed to programming the data into the OTP memory.

The virtual memory may also be used to link data stored in the static memory with other data stored in the OTP memory. For example, as described in further detail below, the static memory may be used to store data corresponding to a command and the OTP memory may be used to store status information (e.g., a lifecycle bit) for the command. Software using the device may implement the command based on a combination of the data stored in the OTP memory and the data stored in the static memory. For example, if a bit of the OTP memory is at a first value corresponding to enabling the command, then the command stored in the static memory may be implemented or accessed. However, if the bit of the OTP memory is at a second value corresponding to disabling the command, then the command that is stored in the static memory may not be implemented or may not be accessed.

As such, a device with a virtual OTP memory manager component may use a virtual memory that maps virtual addresses to physical addresses of an OTP memory and physical addresses of static memory. For example, the virtual memory may be presented to read requests and/or write requests intended to access the OTP memory. The virtualization of the OTP memory may allow for the space of the OTP memory to be used for other data as some data intended to be stored in the OTP memory by a manufacturing facility may instead be previously stored in static memory. Furthermore, as described in further detail below, read and write accesses to the OTP memory of the device may be based on the virtual memory.

Figure 1:
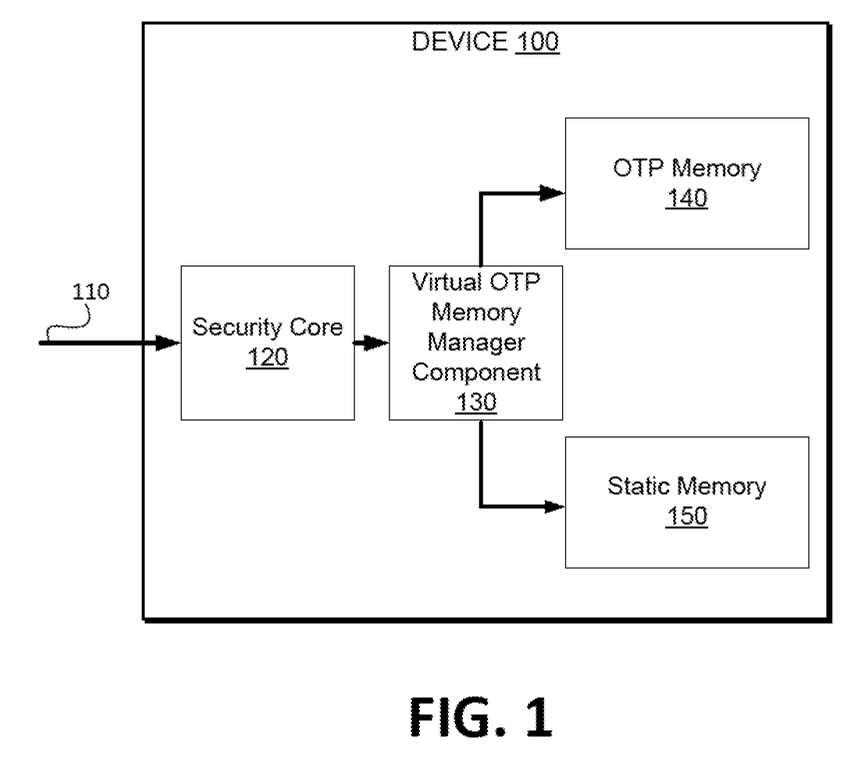
FIG. 1 illustrates an example device with a virtual one-time programmable (OTP) memory manager component in accordance with some embodiments.

FIG. 1 illustrates an example device 100 with a virtual OTP memory manager component. In general, the device 100 may correspond to an integrated circuit such as a system on a chip (SoC). The device 100 may include a virtual OTP memory manager component 130 that provides a virtual memory that is mapped to a physical OTP memory and a physical static memory.

As shown in FIG. 1, the device 100 may include a virtual OTP memory manager component 130 that manages a virtual memory that is mapped to both an OTP memory 140 and a static memory 150. The OTP memory 140 may be a type of digital memory implemented in circuitry or silicon of a device that may be programmed and cannot be changed after being programmed. For example, data (e.g., a unique device identification or unique device key) may be programmed into the OTP memory 140 of the device and the data may not be changed in the OTP memory after the programming of the data into the OTP memory. Furthermore, the OTP memory 140 may be a type of digital memory where the setting of each bit of the OTP memory 140 is locked by a fuse (e.g., an electrical fuse associated with a low resistance and designed to be permanently break an electrically conductive path after the programming or setting of a corresponding bit) or an antifuse (e.g., an electrical component associated with an initial high resistance and designed to permanently create an electrically conductive path after the programming or setting of a corresponding bit). As an example, each bit of the OTP memory 140 may start with an initial value of '0' and may be programmed or set to a later value of '1' (or vice versa). Thus, in order to program or set a device specific key or a unique device identification (ID) with a value of '10001' into the OTP memory 140, two bits of the OTP memory 140 may be programmed from the initial value of '0' to the later value of '1.' Once the two bits of the OTP memory 140 have been programmed to the later value of '1', then the two bits may not be programmed back to the value of '0.' As such, the bits of the OTP memory 140 may be programmed once and may not be changed once programmed.

The static memory 150 may be a netlist, a read-only memory (ROM), or any other type of memory element. A netlist may refer to circuitry of an integrated circuit. For example, the netlist may refer to the connectivity of circuit components of an integrated circuit of the device 100 that is used to store values corresponding to bits. Thus, the netlist may refer to bit values that are stored or embodied in an integrated circuit. A read-only memory may refer to a memory that is not programmed and/or a memory where bits of the memory cannot be changed.

The device 100 may further include a security core 120 that may provide security features for the device 100. For example, the security core 120 may provide a hardware root of trust or other security features for a software application that uses the device 100. In some embodiments, the security core 120 may receive a command 110 from a manufacturing facility (e.g., an off-chip or off-device command from equipment of the manufacturing facility) and may transmit the command 110 to the virtual OTP memory management component 130. The security core 120 and associated software may access the virtual memory provided by the virtual OTP memory manager component 130 which may map or translate the command 110 using the virtual memory to the OTP memory 140 and the static memory 150. In some embodiments, when the security core 120 transmits a read command or a write command to the OTP memory 140, the virtual memory provided by the virtual OTP memory manager component 130 may be used.

As an example, equipment of a manufacturing facility may transmit the command 110 to the device 100. The command 110 may include data that the manufacturing facility intends to have stored or programmed into the OTP memory 140 of the device 100. The command 110 may be to store a device key that is shared among multiple devices. However, the device key may be stored in the netlist or a ROM that is implemented in each of the multiple devices when the integrated circuit of the multiple devices were manufactured or fabricated. The security core 120 may receive the command 110 and may transmit the command to the virtual OTP memory manager component 130. In some embodiments, the virtual OTP memory manager component 130 may determine if the same data from the command 110 is currently stored in the static memory 150. If the data from the command is already stored in the static memory 150, then the virtual OTP memory manager component 130 may identify that the data is already stored in the static memory 150 and may not write the data from the command 110 into the OTP memory 140. Furthermore, the virtual OTP memory manager component 130 may transmit a status indicator back to the security core and/or the manufacturing facility to indicate that the data from the command 110 was successfully stored or programmed into the OTP memory 140 despite not actually programming the OTP memory 140. The manufacturing facility may transmit a subsequent command intended to store subsequent data to the OTP memory 140 after receiving the status indicator.

Figure 2:
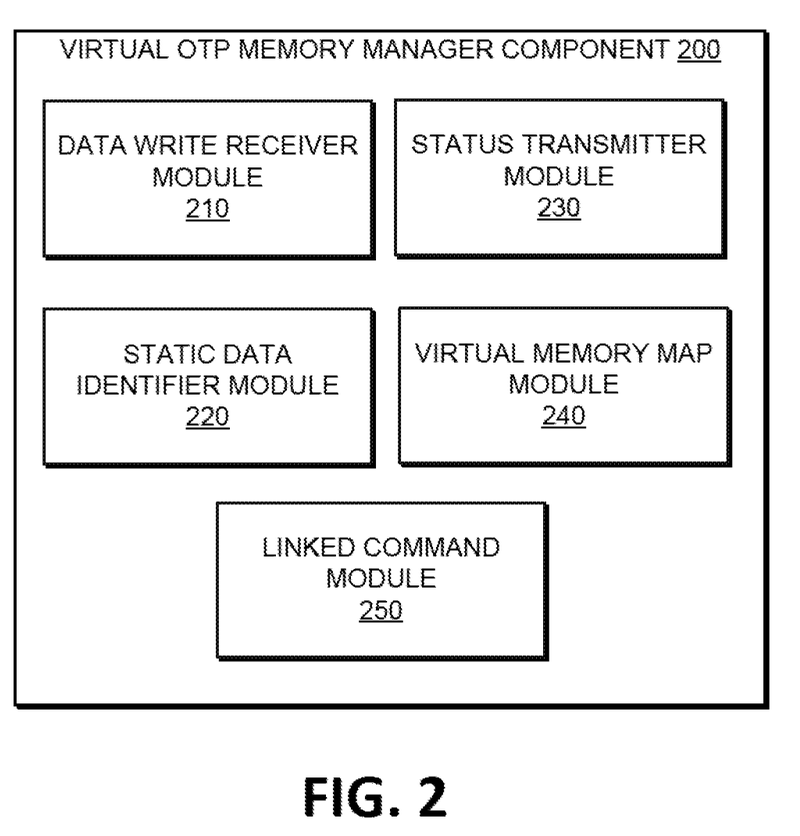
FIG. 2 is a block diagram of an example virtual OTP memory manager component in accordance with some embodiments.

FIG. 2 is a block diagram of an example virtual OTP memory manager component 200. In general, the virtual OTP memory manager component 200 may correspond to the virtual OTP memory manager component 130 of FIG. 1. The virtual OTP memory manager component 200 may include a data write receiver module 210, a static data identifier module 220, a status transmitter module 230, a virtual memory map module 240, and a linked command module 250. In alternative embodiments, the functionality of one or more of the modules may be combined or divided.

As shown in FIG. 2, the virtual OTP memory manager component 200 may include a data write receiver module 210 that may receive a command (e.g., command 110) from equipment of a manufacturing facility. In some embodiments, the command may be received from test equipment or provisioning equipment that is to program an OTP memory of a device that includes the virtual OTP memory manager component 200. The command that is received by the write receiver module 210 may correspond to data that is intended to be stored in the OTP memory. The static data identifier module 220 may identify whether the data from the received command is currently stored in static memory (e.g., a netlist or a ROM). For example, the static data identifier module 220 may determine if data that matches the data from the command is currently stored in the static memory or if data from the static memory does not match the data from the command. The status transmitter module 230 may transmit a status indicator that indicates whether or not the received data is currently stored in the static memory. For example, the status transmitter module 230 may transmit a status indicator that indicates to the manufacturing facility that the data was stored in the OTP memory if the data from the command was identified as currently being stored in the static memory (i.e., the status indicator transmits an indication that the data was programmed into the OTP memory despite not being programmed into the OTP memory). Alternatively, the status transmitter module 230 may transmit a status indicator that indicates an error if the data from the command is not stored in the static memory. For example, if no data currently stored in the static memory matches the data from the command, then the status transmitter module 230 may transmit a status indicator that indicates that no data was programmed into the OTP memory. Further details with regard to the status indicator are disclosed in conjunction with FIG. 3B.

The virtual memory map module 240 may provide a virtual memory that is mapped to both OTP memory and static memory. For example, when a software application using a device that includes the virtual OTP memory manager component 200 attempts to access memory, the software application may access the virtual memory that is mapped to physical memory (e.g., the OTP memory and the static memory). Further details with regard to the virtual memory are disclosed in conjunction with FIGS. 3A and 4. The linked command module 250 may link data from the OTP memory with other data from the static memory. For example, a command corresponding to features or capability of a device may be stored in the static memory and may also be linked with status information (e.g., a status bit or lifecycle bit) that is stored in the OTP memory. Software may access the virtual memory to implement the command stored in the static memory that may be allowed or not allowed based on the status information stored in the OTP memory. Further details with regard to linked commands are disclosed in conjunction with FIG. 5.

Figure 3A:
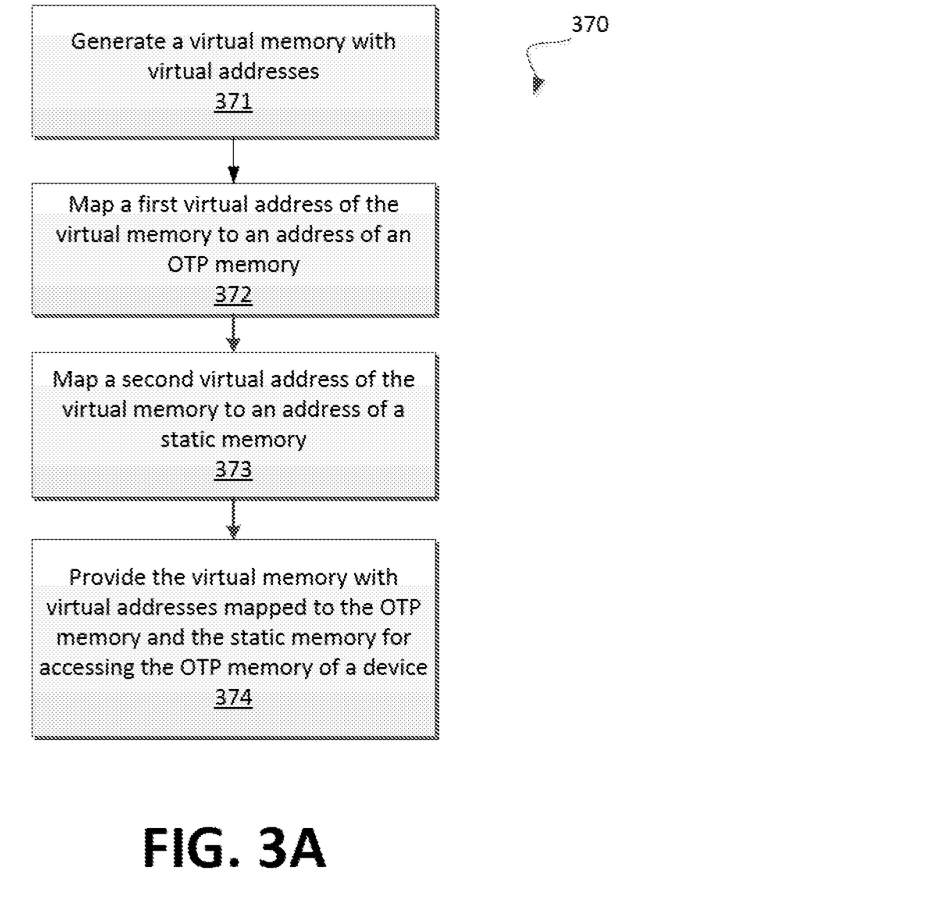
FIG. 3A is a flow diagram of an example method to provide a virtual memory based on an OTP memory and a static memory in accordance with some embodiments of the present disclosure.

FIG. 3A is a flow diagram of an example method 370 to provide a virtual memory based on an OTP memory and a static memory. In general, the method 370 may be performed by processing logic that may comprise hardware (e.g., processing device, circuitry, dedicated logic, programmable logic, microcode, hardware of a device, integrated circuit, etc.), software (e.g., instructions run or executed on a processing device), or a combination thereof. In some embodiments, the method 370 may be performed by the virtual OTP memory manager component 130 or 200 of FIG. 1 or 2.

As shown in FIG. 3A, the method 370 may begin with the processing logic generating a virtual memory with virtual addresses (block 371). For example, a virtual memory address range including multiple virtual memory addresses may be generated. The processing logic may further map a first virtual address of the virtual memory to an address of an OTP memory (block 372). For example, at least one of the virtual addresses may be mapped to a physical address of the OTP memory so that the virtual address points to a physical address of the OTP memory. In some embodiments, when the virtual address is accessed, the data stored at the physical address of the OTP memory that is mapped to the virtual address may be retrieved. The processing logic may further map a second virtual address of the virtual memory to an address of a static memory (block 373). For example, another virtual address may be mapped to a physical address of the static memory so that the other virtual address may point to a physical address of the static memory. In some embodiments, when the other virtual address is accessed, the data stored at the physical address of the static memory that is mapped to the other virtual address may be retrieved. Furthermore, the processing logic may provide the virtual memory with virtual addresses that are mapped to the OTP memory and the static memory for accessing the OTP memory of a device (block 374). For example, a single memory address range (e.g., the virtual memory address range) may be provided for accessing the OTP memory of the device. However, since the virtual memory is mapped to both an OTP memory and a static memory, write requests and read requests to the OTP memory may be directed to either the OTP memory or the static memory. For example, the virtual memory may be used when write requests and/or read requests attempt to access the OTP memory. For example, a write request may access the first virtual address of the virtual memory and may access the address of the OTP memory that is mapped to the first virtual address. Furthermore, a subsequent write request may access the second virtual address of the virtual memory while intended to write or program data into the OTP memory, but since the second virtual address is mapped to the address of the static memory, the subsequent write request may not result in the programming of the OTP memory. Similarly, a read request intended to read OTP memory may access the second virtual address and may result in the accessing of the address of the static memory that is mapped to the second virtual address.

As such, a virtual memory may be used to service write requests and read requests intended to read and/or write data stored in an OTP memory. However, since the virtual memory is mapped to both the OTP memory and the static memory, if the read request or the write request accesses a virtual address that is mapped to the static memory, the write request or the read request may access the static memory as opposed to the virtual memory.

Figure 3B:
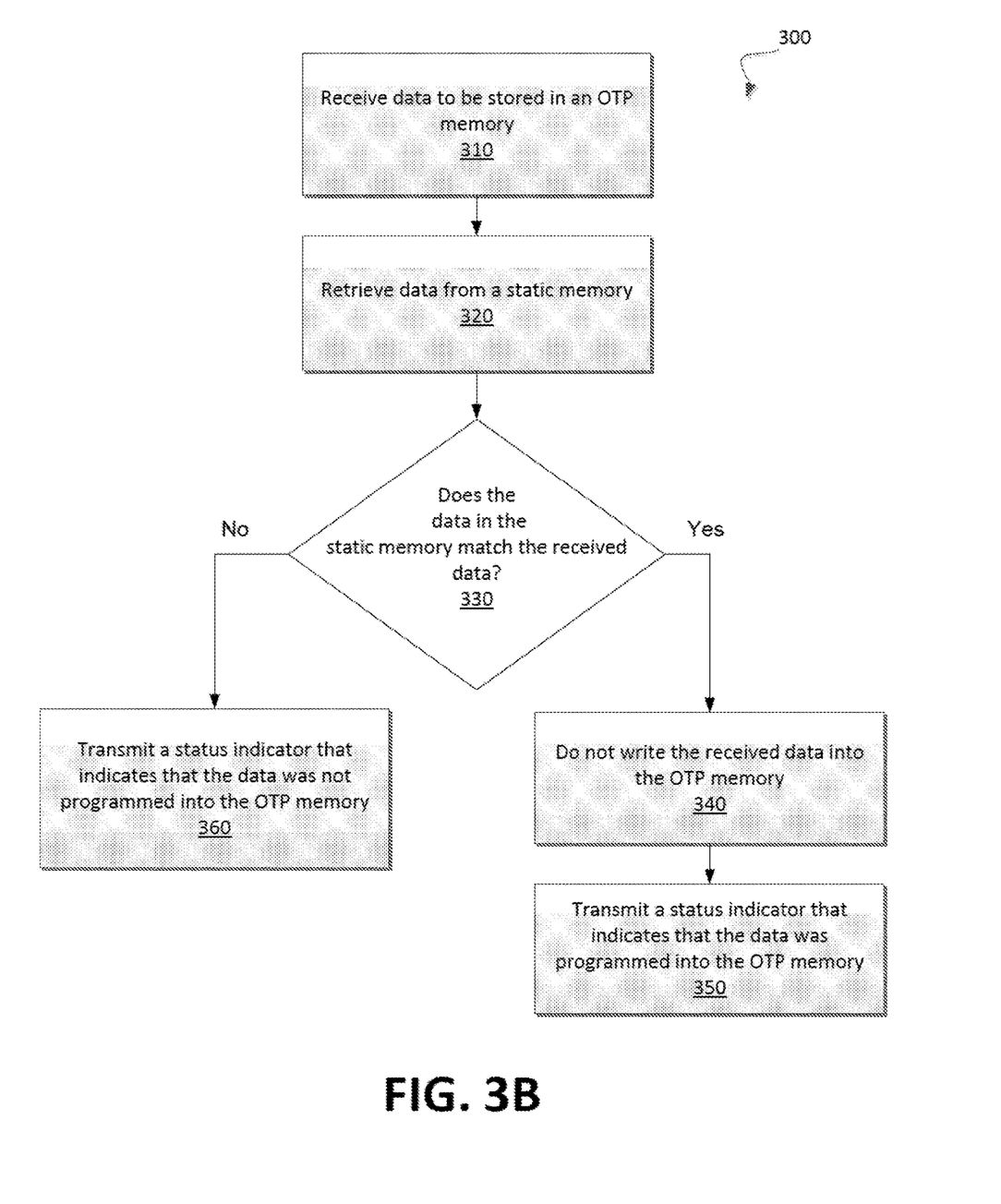
FIG. 3B is a flow diagram of an example method to transmit a status indicator corresponding to data associated with static memory in accordance with some embodiments of the present disclosure.

FIG. 3B is a flow diagram of an example method 300 to transmit a status indicator corresponding to data associated with static memory. In general, the method 300 may be performed by processing logic that may comprise hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 may be performed by the virtual OTP memory manager component 130 or 200 of FIG. 1 or 2.

As shown in FIG. 3B, the method 300 may begin with the processing logic receiving data to be stored in an OTP memory (block 310). For example, a command (e.g., a write request) including data intended to be written, stored, or programmed to OTP memory may be received from equipment of a manufacturing facility. The processing logic may retrieve data from a static memory (block 320). For example, data that is stored in a netlist or a ROM may be identified. The processing logic may further determine if the data that is intended to be programmed to the OTP memory is already stored in the static memory (block 330). For example, a determination may be made as to whether data stored in the static memory matches or does not match the data intended to be written to the OTP memory. In some embodiments, the command may specify a virtual address that the data is to be written to and the determination may be whether the data of the command is stored in a particular physical address of the static memory that is mapped to the virtual address. If the data that is intended to be programmed into the OTP memory is already stored in the static memory, then the processing logic may not write the data into the OTP memory (block 340). Furthermore, the processing logic may transmit a status indicator that indicates that the data was programmed into the OTP memory (block 350). However, as previously described, the processing logic has not programmed the data into the OTP memory. If the data that is intended to be programmed into the OTP memory is not already stored in the static memory, then the processing logic may transmit a status indicator that indicates that the data was not programmed into the OTP memory (block 360). For example, the status indicator may identify that an error has occurred and that the data from the command has not been programmed into the OTP memory.

Figure 4:
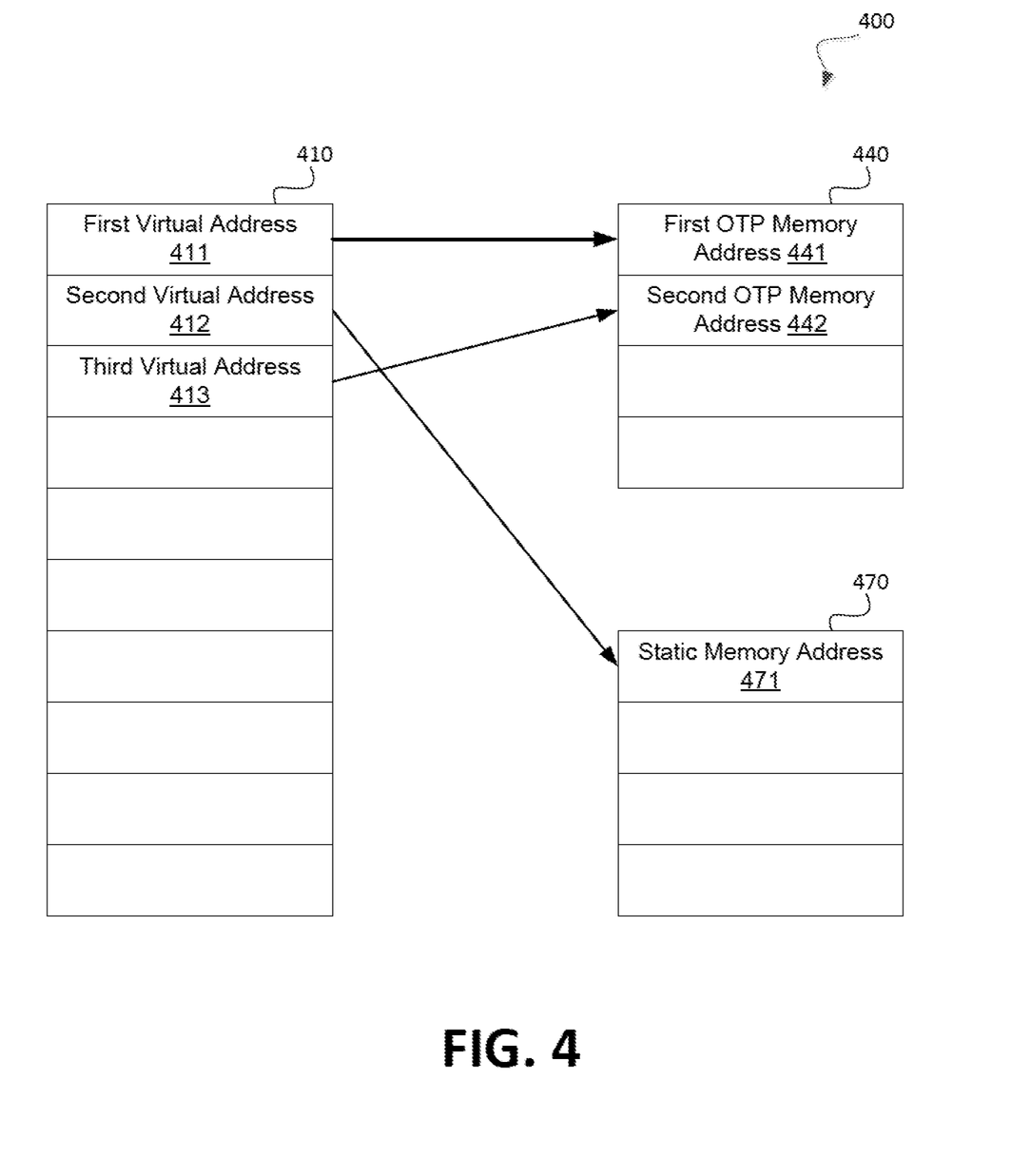
FIG. 4 is an illustration of an example mapping between virtual memory and a combination of OTP memory and static memory in accordance with some embodiments.

FIG. 4 is an illustration of an example mapping 400 between virtual memory and a combination of OTP memory and static memory. In general, the mapping 400 illustrates a translation of virtual addresses of a virtual memory 410 with physical addresses of an OTP memory and physical addresses of a static memory. The mapping 400 may be provided by the virtual OTP memory manager component 130 or 200 of FIG. 1 or 2.

As shown in FIG. 4, the mapping 400 illustrates the translation of virtual addresses of the virtual memory 410 to physical addresses of the OTP memory 440 and physical addresses of the static memory 470. The virtual memory 410 may include a first virtual address 411, a second virtual address 412, and a third virtual address 413. The first virtual address 411 may correspond to an address for unique device information (e.g., a unique device ID or a unique device key that is not common to any other device). For example, the first virtual address 411 may be used to access a unique device key that is stored in the OTP memory 440 of the device. Software using the device may access the unique device key by accessing the first virtual address 411 of the virtual memory 410. The first virtual address 411 may be mapped or translated to an address 441 of the OTP memory 440. Thus, a unique device key or other such information (e.g., a unique device ID) may be stored in the address 441 of the OTP memory 440 that is mapped to the first virtual address 411 of the virtual memory 410.

The second virtual address 412 of the virtual memory 410 may correspond to a command to provide a feature or capability of the device. For example, the command may correspond to a feature or capability of the device that may be performed or accessed upon a start-up or power-on of the device. In some embodiments, the functionality or capability may correspond to a debug function of the device. The command may be enabled or disabled by the device based on a status indicator that corresponds to the third virtual address 413 of the virtual memory 410. For example, the command may be enabled if the status indicator is set at a first value and the command may be disabled if the status indicator is set at a second value. As shown, the second virtual address 412 corresponding to the command may be mapped to a physical address 471 of the static memory 470. For example, data corresponding to the command is stored in the physical address 471 of the static memory 470 and may be accessed by software of the device accessing the second virtual address 412 of the virtual memory 410. Furthermore, the third virtual address 413 corresponding to the status indicator of the command may be mapped to another physical address 442 of the OTP memory 440. For example, data corresponding to the status indicator is stored in the physical address 442 of the OTP memory 440 and may be accessed by software of the device accessing the third virtual address 413 of the virtual memory 410.

The physical address 442 of the OTP memory 440 and the physical address 471 of the static memory 470 may be considered to be linked as the data stored in the static memory 470 at the physical address 471 depends upon the data stored in the OTP memory 440 at the physical address 442. For example, the physical address 442 may correspond to a bit of the OTP memory. If the bit at the physical address 442 of the OTP memory 440 is at a first value (e.g., a value of '0') corresponding to disabling the command stored at the physical address 471 of the static memory 470, then the command may not be allowed to be performed by the device. However, if the bit at the physical address 442 is at a second value that is different than the first value (e.g., a value of '1') corresponding to enabling the command stored at the physical address 471 of the static memory 470, then the command may be allowed to be performed by the device.

As such, a command that is used to execute or perform a function or capability of the device may be specified by a virtual address that is mapped to the static memory while status indicator for the command may be specified by another virtual address that is mapped to the OTP memory.

Figure 5:
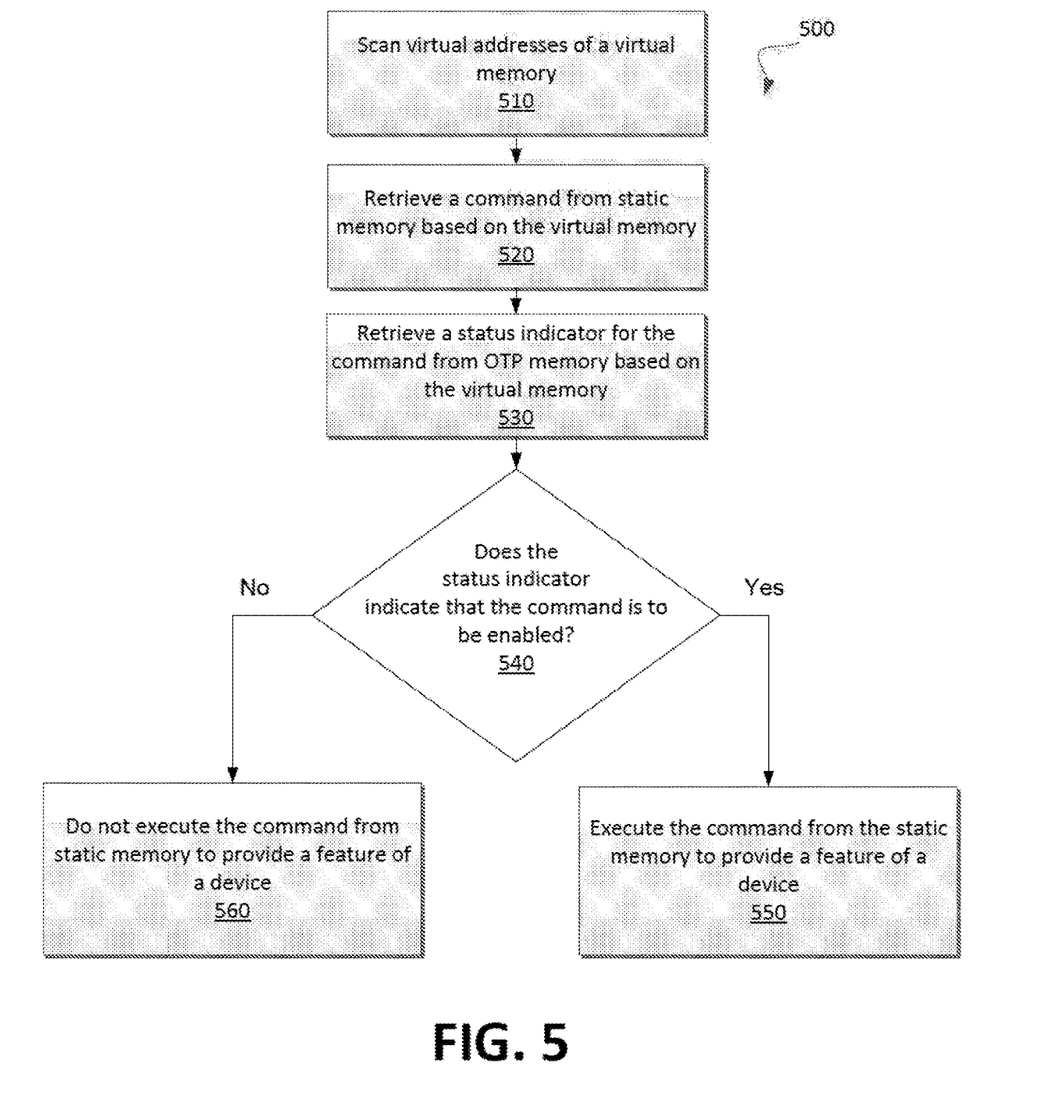
FIG. 5 is a flow diagram of an example method to perform a function of a device based on data retrieved from both OTP memory and static memory in accordance with some embodiments.

FIG. 5 is a flow diagram of an example method 500 to perform a feature based on data retrieved from both OTP memory and static memory. In general, the method 500 may be performed by processing logic that may comprise hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 may be performed by the virtual OTP memory manager component 130 or 200 of FIG. 1 or 2.

As shown in FIG. 5, the method 500 may begin with the processing logic scanning virtual addresses of a virtual memory (block 510). For example, the scanning of the virtual addresses of the virtual memory of a device may be in response to a powering up or an initialization of the device using the virtual memory. The scanning of the virtual memory may correspond to reading the data that is mapped to the virtual memory. For example, a read request of the virtual addresses may be received. One of the virtual addresses may correspond to command of one or more features (e.g., functions or capabilities of a device) that are to be implemented or accessed by the device upon power up or initialization of the device. For example, the command may be instructions for performing actions associated with features or capabilities of the device. In response to the scanning of the virtual addresses, the processing logic may retrieve the command from static memory based on the virtual memory (block 520). For example, the command may be retrieved from a physical address corresponding to a netlist or a ROM that is mapped to a virtual address of the virtual memory. The command (i.e., command data) may be retrieved in response to a read request corresponding to the virtual address that is mapped to the physical address of the static memory. The command may specify one or more features or functions of the device that are to be implemented. Furthermore, the processing logic may retrieve a status indicator for the command from an OTP memory based on the virtual memory (block 530). For example, the status indicator may be at least one bit that may indicate whether the command is to be performed or is not to be performed upon power up or initialization of the device. The status indicator may be retrieved from a physical address corresponding to an OTP memory that is mapped to another virtual address of the virtual memory. For example, the status indicator (i.e., status data for the command data) may be retrieved in response to another read request that corresponds to another virtual address that is mapped to a physical address of the OTP memory of a device. The processing logic may determine if the status indicator indicates that the command is to be enabled (block 540). For example, if the status indicator from the OTP memory indicates that the command is to be enabled, then the command from the static memory may be executed to provide a feature of the device (block 550). For example, the feature may be provided upon power up or initialization of the device by performing a function or capability of the device. However, if the status indicator from the OTP memory indicates that the command is not to be enabled (i.e., disabled), then the command from the static memory may not be executed to provide the feature of the device (block 560). For example, the feature may not be provided upon the power up or the initialization of the device.

In some embodiments, the status indicator stored in the OTP memory may be changed at a later time from indicating that the command is to be disabled to indicating that the command is to be enabled. For example, as previously described, the status indicator may correspond to a bit in the OTP memory. The bit corresponding to the status indicator may be at a first value of '0' (e.g., not programmed) where the first value disables the command. As such, the bit stored at the OTP memory may not allow the command stored at the static memory to be executed. At a second time, the bit stored at the OTP memory may be programmed to be at a second value of '1' where the second value enables the command. As such, the bit stored at the OTP memory may subsequently allow the command stored at the static memory to be executed.

Figure 6:
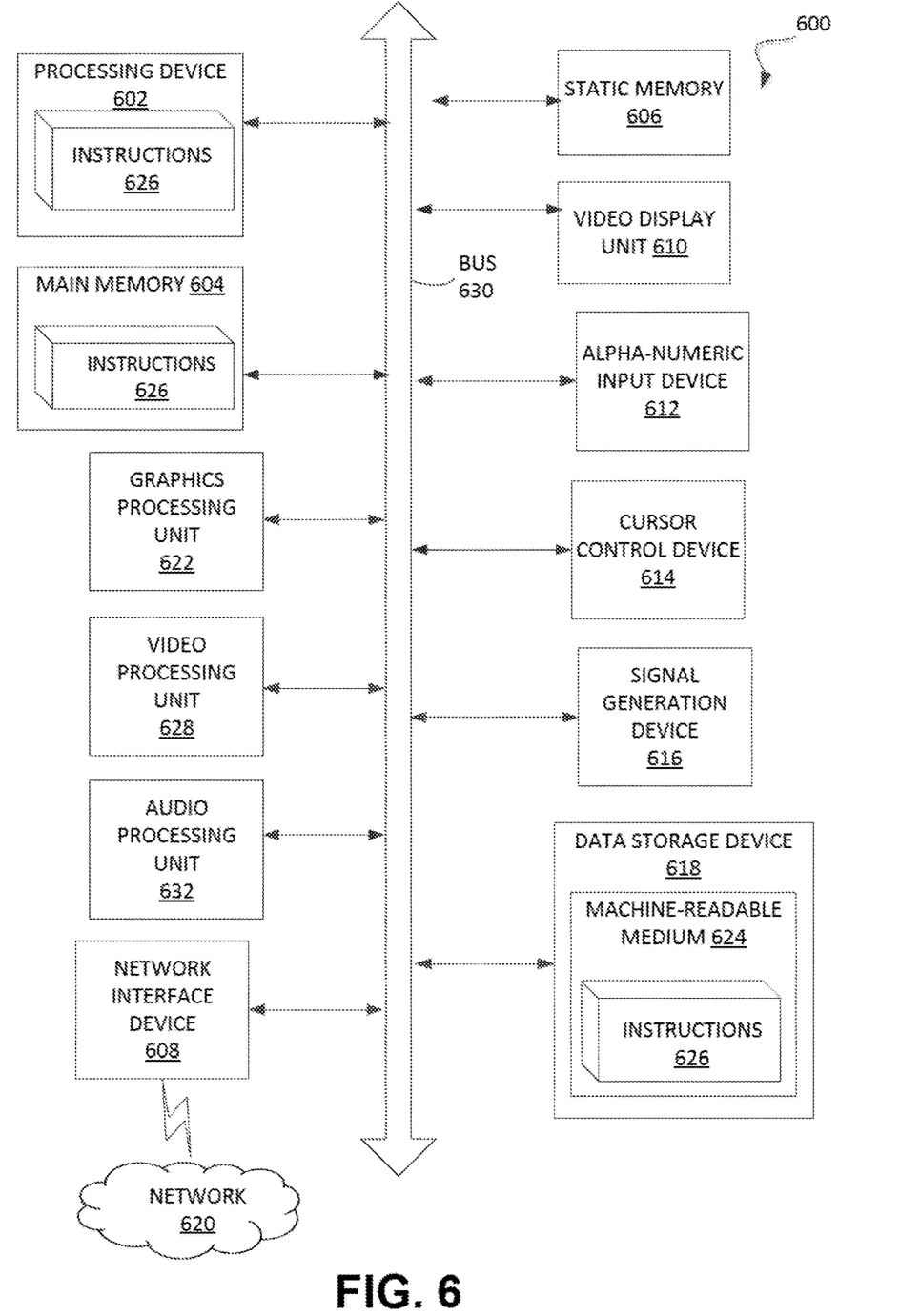
FIG. 6 illustrates a block diagram of an embodiment of a computer system in which some embodiments of the disclosure may operate.

FIG. 6 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein.

The computer system 600 may further include a network interface device 608 to communicate over the network 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), a graphics processing unit 622, a signal generation device 616 (e.g., a speaker), graphics processing unit 622, video processing unit 628, and audio processing unit 632.

The data storage device 618 may include a machine-readable storage medium 624 (also known as a computer-readable medium) on which is stored one or more sets of instructions or software 626 embodying any one or more of the methodologies or functions described herein. The instructions 626 may also reside, completely or at least partially, within the main memory 604 and/or within the processing device 602 during execution thereof by the computer system 600, the main memory 604 and the processing device 602 also constituting machine-readable storage media.

In one implementation, the instructions 626 include instructions to implement functionality corresponding to a virtual OTP memory manager component (e.g., virtual OTP memory manager component 130 or 200 of FIG. 1 or 2). While the machine-readable storage medium 624 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method comprising:
    receiving a write operation to store data at a one-time programmable (OTP) memory of a device;
    retrieving other data stored at a static memory of the device;
    determining, by a processing device, whether the other data stored at the static memory of the device corresponds to the data of the write operation for the OTP memory; and
    in response to determining that the other data stored at the static memory corresponds to the data of the write operation, providing an indication specifying that the data has been programmed to the device without performing the write operation to store the data at the OTP memory.

2. The method of claim 1, wherein the indication further specifies that the data has been previously stored at the static memory of the device.

3. The method of claim 1, wherein the data corresponds to a device key, and wherein the other data corresponds to the data responsive to the other data including the device key.

4. The method of claim 1, further comprising:
    in response to determining that the other data stored at the static memory does not correspond to the data of the write operation, providing an indication specifying that the data has not been programmed to the OTP memory of the device.

5. The method of claim 1, wherein the indication further specifies that the data has been programmed to the OTP memory of the device without performing the write operation to store the data at the OTP memory.

6. The method of claim 1, wherein the static memory corresponds to a netlist of the device.

7. The method of claim 1, wherein the static memory corresponds to a read-only memory (ROM) of the device.

8. A system comprising:
    a memory; and
    a processing device, operatively coupled with the memory, to:
    receive a write operation to store data at a one-time programmable (OTP) memory of a device;
    retrieve other data stored at a static memory of the device;
    determine whether the other data stored at the static memory of the device corresponds to the data of the write operation for the OTP memory; and
    in response to determining that the other data stored at the static memory corresponds to the data of the write operation, provide an indication specifying that the data has been programmed to the device without performing the write operation to store the data at the OTP memory.

9. The system of claim 8, wherein the indication further specifies that the data has been previously stored at the static memory of the device.

10. The system of claim 8, wherein the data corresponds to a device key, and wherein the other data corresponds to the data responsive to the other data including the device key.

11. The system of claim 8, wherein the processing device is further to:
    in response to determining that the other data stored at the static memory does not correspond to the data of the write operation, provide an indication specifying that the data has not been programmed to the OTP memory of the device.

12. The system of claim 8, wherein the indication further specifies that the data has been programmed to the OTP memory of the device without performing the write operation to store the data at the OTP memory.

13. The system of claim 8, wherein the static memory corresponds to a netlist of the device.

14. The system of claim 8, wherein the static memory corresponds to a read-only memory (ROM) of the device.

15. A non-transitory computer readable medium comprising instructions, which when executed by a processing device, cause the processing device to perform operations comprising:
    receiving a write operation to store data at a one-time programmable (OTP) memory of a device;
    retrieving other data stored at a static memory of the device;
    determining whether the other data stored at the static memory of the device corresponds to the data of the write operation for the OTP memory; and
    in response to determining that the other data stored at the static memory corresponds to the data of the write operation, providing an indication specifying that the data has been programmed to the device without performing the write operation to store the data at the OTP memory.

16. The non-transitory computer readable medium of claim 15, wherein the indication further specifies that the data has been previously stored at the static memory of the device.

17. The non-transitory computer readable medium of claim 15, wherein the data corresponds to a device key, and wherein the other data corresponds to the data responsive to the other data including the device key.

18. The non-transitory computer readable medium of claim 15, the operations further comprising:
   in response to determining that the other data stored at the static memory does not correspond to the data of the write operation, providing an indication specifying that the data has not been programmed to the OTP memory of the device.

19. The non-transitory computer readable medium of claim 15, wherein the indication further specifies that the data has been programmed to the OTP memory of the device without performing the write operation to store the data at the OTP memory.

20. The non-transitory computer readable medium of claim 15, wherein the static memory corresponds to a read-only memory (ROM) or a netlist of the device.

* * * * *